UNITED STATES PATENT OFFICE.

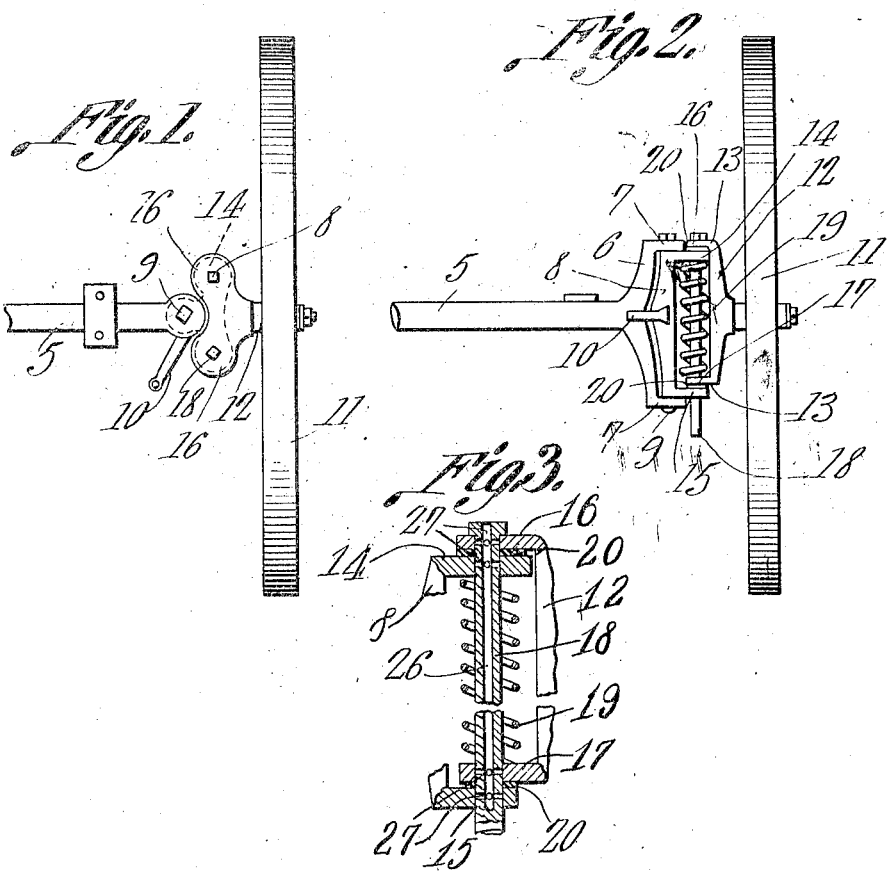

PETER KILTZ, OF RICH HILL, MISSOURI.

VEHICLE RUNNING-GEAR.

1,058,604. Specification of Letters Patent. Patented Apr. 8, 1913.
Application filed August 18, 1910. Serial No. 577,689.

*To all whom it may concern:*

Be it known that I, PETER KILTZ, a citizen of the United States, residing at Rich Hill, in the county of Bates and State of Missouri, have invented a new and useful Vehicle Running-Gear, of which the following is a specification.

It is the object of the present invention to provide an improvement in running gear for vehicles and more particularly for automobiles, the primary aim of the invention being to provide for the cushioning of the wheels with respect to the axle without the necessity of employing rubber or otherwise yieldable tires.

Briefly stated, the invention resides in the provision, as a connection between the axle ends and the wheel spindles, of an axle fork and a spindle fork held by suitable means, for relative movement vertically and interposing between these two forks a cushion element such as a spring.

The invention aims further to provide a novel means for automatically lubricating the forks.

With the above objects and aims in view, the invention resides in the novel construction and arrangement of parts shown in the accompanying drawings, in which, Figure 1 is a top plan view of a wheel and axle connected by the device embodying the present invention. Fig. 2 is a rear elevation. Fig. 3 is a detail vertical section through the two yokes and one of the securing tubular lubricant supplying bolts.

Referring specifically to the drawings, there is shown a front axle indicated by the numeral 5 and formed at its ends with a fork 6 the extremities of which are indicated by the numeral 7 and are in vertical alinement. A steering knuckle indicated by the numeral 8 is fitted between the extremities of the fork 6 and a pivot bolt 9 is secured through the extremities of the said fork and the said steering knuckle. The knuckle is provided with the usual arm 10 which extends rearwardly therefrom to which is connected the steering apparatus (not shown). In the said figures of the drawings, one of the front wheels is illustrated and is indicated by the numeral 11 and integral with the spindle of this wheel is a spindle fork 12 the extremities of which are indicated by the numeral 13.

The steering knuckle 8 at its upper end is provided with a pair of ears 14 and at its lower end with a pair of ears 15 and the corresponding ones of the ears 14 and 15 are in vertical alinement. In a like manner, the spindle fork 12 is formed at its upper end with a pair of spaced ears 16 and at its lower end with a similar pair of ears 17, the corresponding ears 16 and 17 being in vertical alinement as in the case of the ears 14 and 15. In assembling the fork and steering knuckle, the two members are disposed with the ears 16 lying above the ears 14 and the ears 17 lying above the ears 15 and pins 18 are loosely inserted through registering openings formed in the several ears and serve to rigidly connect the spindle fork with the steering knuckle, that is as far as relative pivotal movement of the two members is concerned although it will be readily understood that the fork 12 may have vertical movement relative to the knuckle 8. In order that this vertical movement of the fork 12 with respect to the steering knuckle 8 may be cushioned, there is applied upon each of the pins 18 a spring 19 which at its upper end bears against the under side of the corresponding ear 14 and at its lower end against the upper side of the corresponding ear 17. A rubber washer 20 is fitted upon each stem 18 between the ears 14 and 16 and ears 15 and 17 and these washers being of limited compressibility serve to prevent rattling of the parts at the time of their relative movement and serve to cushion the return of the parts to normal position after the spring has been compressed by reason of their relative movement.

As illustrated in Fig. 3, the pin 18 is provided with the hollow lubricant retaining bore 26, which has led therefrom the plurality of apertures 27 adjacent the respective yoke ends of the device, the same providing means for lubricating the outer circumference of the pin 18 and the adjacent portions of the yoke ends.

What is claimed is:

The combination with an axle and stub-shaft, said axle having two spaced arms for supporting the stub-shaft for horizontal swinging movements, of a yoke pivotally mounted between the spaced arms of the axle and having two spaced terminals of greater width than the arms, each of said terminals having two apertures, a second yoke fixedly connected to the stub-axle and having spaced apertured terminals to correspond to the terminals of the pivoted yoke, the terminals of the fixed yoke being disposed above the respective terminals of the pivoted yoke, two tubular bolts, each of which is vertically disposed through the alined apertures of the terminals of both yokes, a spring disposed upon each bolt between the terminals of the yokes, and a cushion of less compressibility than the spring disposed on the bolts between adjacent faces of corresponding terminals.

In testimony that I claim the foregoing as my own, I have hereto affixed my signature in the presence of two witnesses.

PETER KILTZ.

Witnesses:
 GEO. TEMPLETON,
 HERMAN HOOVER.